Dec. 15, 1959   J. N. MORRELL   2,916,947
CONTROL FOR VALVE OR THE LIKE
Filed June 7, 1955   6 Sheets-Sheet 1

INVENTOR
JAMES N. MORRELL

INVENTOR
JAMES N.
MORRELL

Dec. 15, 1959  J. N. MORRELL  2,916,947
CONTROL FOR VALVE OR THE LIKE
Filed June 7, 1955  6 Sheets-Sheet 3

INVENTOR
JAMES N. MORRELL

Dec. 15, 1959     J. N. MORRELL     2,916,947
CONTROL FOR VALVE OR THE LIKE
Filed June 7, 1955     6 Sheets-Sheet 4

INVENTOR
JAMES N. MORRELL

Dec. 15, 1959 J. N. MORRELL 2,916,947
CONTROL FOR VALVE OR THE LIKE
Filed June 7, 1955 6 Sheets-Sheet 6

FIG. 13.

INVENTOR
JAMES N. MORRELL

United States Patent Office 2,916,947
Patented Dec. 15, 1959

2,916,947

CONTROL FOR VALVE OR THE LIKE

James N. Morrell, Piney Point, Tex.

Application June 7, 1955, Serial No. 513,763

6 Claims. (Cl. 74—625)

This invention relates to an automatic non-coincidental control for a valve or the like. More particularly, this invention pertains to a valve control clutch mechanism which is normally kept in a position of motor operation relation but subject to being shifted to handwheel operation relation position while the control handwheel is being turned.

Operable valve controls which were non-coincidental began to be used more than a generation ago. Such a non-coincidental valve control commonly included an operator for a valve having a motor and a handwheel for alternate operation of the stem of such valve. Thereby, if the motor were turned on, which might be done at a remote point out-of-sight of the valve carrying such control, the handwheel was disconnected from the gear mechanism to protect from injury any person who might be in contact with the handwheel. In certain old valve controls, the commencement of motor operation disconnected the handwheel but at the same time threw a motor so-called "declutch" lever through an arc which might be hazardous if anyone were within range thereof at the time it was thrown. In addition, such prior valve controls often employed a clutch on the low speed side of the valve operator which often caused such clutch to be stuck in motor operation position because of a self-locking worm and worm wheel in the gear mechanism. As a result, extraordinary force often had to be used to separately reset the device lever to handwheel operation position and in some cases the control had to be dismantled to free it properly. These and other prior valve controls were also relatively complicated in construction and in functioning and were subject to other difficulties which plagued the valve control industry.

And, when different kinds of new, modern valve controls began to be manufactured by the E-I-M organization in Houston, Texas, some were constructed so that there was an automatic return to hand operation relation position upon discontinuance of motor energization. As a result, clutch shifting to motor operation position occurred with each motor energization in the normal utilization of those controls. Further, in those new controls, motor operation was always dominant so long as the motor was energized with a result that turning the handwheel would not take over control despite some emergency or other event which might make hand operation desirable.

My new control of this invention provides a solution to the various drawbacks of prior practices. At the same time, my new control, which is especially adaptable to the operation of valves, is singularly free both of structural complication and of functioning difficulties. My invention is a fully non-coincidental control having new clutch mechanism which normally maintains the new clutch mechanism in motor operation relation position. Thereby, since the majority of operations for the opening and/or closing and/or positioning of a valve are performed by motor when such a valve has a control thereon, my new device maintains clutching engagement normally with the motor rather than with a handwheel or the equivalent and consequently minimizes the number of movements required of the clutch in my new control in a given period to provide a corresponding prolongation of its operating life. In addition, my new control includes means whereby the rotation of the handwheel generates a frictional force which, regardless of the direction of such turning of the handwheel, moves the clutch of my new device out of motor operation relation position and into hand operation condition, whether or not the motor remains on, without exertion of any unusual force. Upon discontinuance of hand operation, an automatic force exerting member restores my new device and its clutch to motor operation relation, again whether or not there is any energization of that motor then in being. Thus, after a motor and after a hand operation, my new device is respectively left in and brought back automatically to motor operation relation position with consequent readiness for instant response of the valve to a further motor actuation. My new combination is wholly automatic and fully non-coincidental and achieves its new results with a minimum of parts and movements.

Other objects and advantages of this invention will be apparent from the following description and from the accompanying drawings, which are illustrative only, in which.

Figures 1, 3:
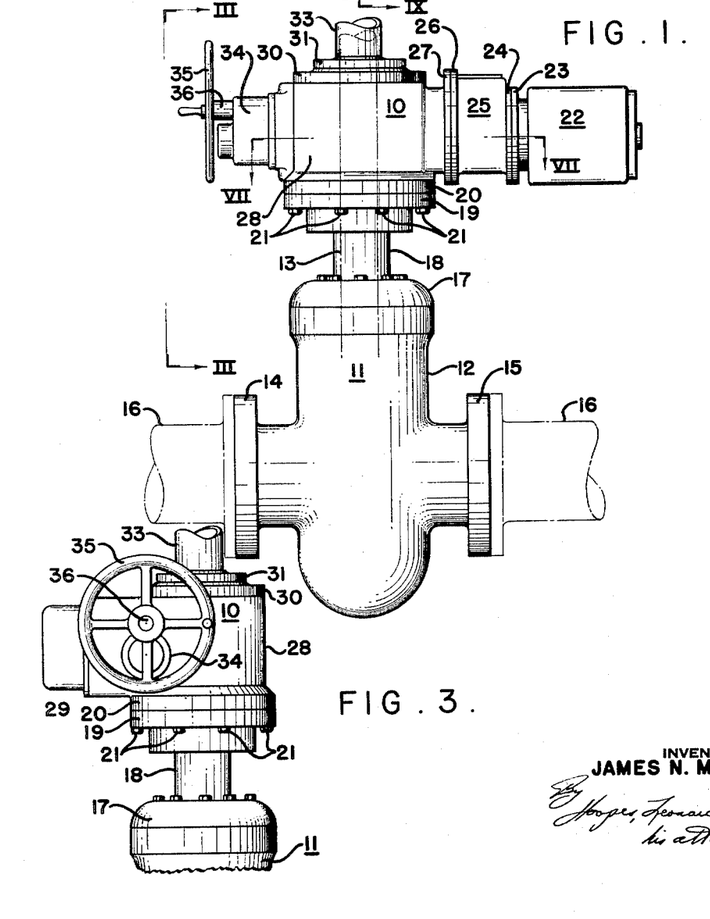
Figure 1 is a view in elevation of my new control mounted on the top of a "rising" stem gate valve.
Figure 3 is an end view principally of the control shown in Figure 1, looking in the direction of lines III—III of Figure 1.
Figure 2:
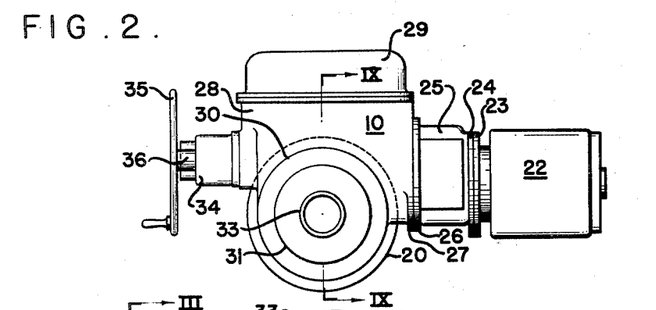
Figure 2 is a plan view of the control shown in Figure 1.

In Figures 1, 2 and 3 of the drawings, a new valve control 10 embodying one form of my invention is shown mounted on top of a valve 11 to operate the same. As shown, valve 11 has a casing 12 having a gate therein which is raised and lowered by a so-called "rising" valve stem 13 to open, to close or to otherwise position the gate across the port extending through the valve and connecting the openings surrounded by the valve flanges 14 and 15. Flanges 14 and 15 may be respectively connected to cooperating flanges of a pipeline 16 in which valve 11 is connected. Valve stem 13 is threaded and extends upwardly through a bonnet 17 and an extension yoke 18 having an adapter 19 thereon. Adapter 19 is provided with bolt holes in registry with drilled and tapped holes in seating flange 20 of new valve control 10. Bolts 21 extending through the registering holes in flanges 19 and 20 secure valve control 10 to valve 11.

Valve control 10 may comprise a reversible electric motor 22 which in the illustrated embodiment is an encased electric motor which may be energized through wiring extending to a remote point or otherwise as desired. The case of motor 22 may be provided with a bolting flange 23 to be attached to a corresponding flange 24 on a casing 25 enclosing my new clutch mechanism which is the principal feature of the new valve control combination disclosed herein. A further flange 26 on casing 25 may be secured to a flange 27. Flange 27 is a part of a gear housing 28 having a switch box 29 affixed to one side thereof. An annular cover 30 may be provided for housing 28 and an annular plate 31 used to close the opening in cover 30 except for a tapped hole 32 therein. A length of pipe 33, capped at its upper end, may be screwed into hole 32 to serve as a protector for stem 13 as it rises and falls under the influence of actuations exercised through valve control 10.

When stem 13 is at the upper limit of its movement, the gate of valve 11 is fully open and the top of stem 13 extends into protector pipe 33. Conversely, when stem 13 is at its lower limit, the gate of valve 11 has closed the valve and the top of stem 13 is correspondingly lower but always in contact with the stem nut in control 10. Although the illustrated embodiment of this invention is shown in cooperation with a rising stem valve, the application of this invention to so-called non-rising stem or other forms of valves and mountings will be readily understood by those skilled in the art, to whom this invention is disclosed. A housing extension 34 is bolted to the side of housing 28 adjacent a handwheel 35 keyed to a handwheel shaft 36 which extends into the valve control 10 and casing 25 to enable control 10 to be operated by hand as hereinbelow described.

In the illustrated embodiment of valve control 10, which is but one of the forms which my invention may take, a motor shaft 37 of motor 22, generally a synchronous alternating current motor, extends through an opening 38 in case 25 and engages a coupling 39 which in turn is keyed to a motor extension shaft 40, the other end of which is journaled in bearing 41. The shafts 37 and 40 are shown in alignment and as shaft 37 rotates, extension shaft 40 correspondingly rotates to rotate a motor drive pinion 42 which is fixed to shaft 40. A motor driven gear 43 is in geared engagement with pinion 42. The gear 43 is loosely mounted on a clutch shaft 44, a retainer ring 45 maintaining gear 43 against a shoulder on the enlarged inner end 44a of clutch shaft 44. Bearings 46 and 47 prevent axial movement of shaft 44 while band 45 prevents axial movement of gear 43, in the illustrated embodiment, relative to shaft 44. A set of arcuate teeth 48 project axially from the face of gear 43 toward a sliding clutch 49 and are at opposite ends of a diameter through the axis of shaft 44 and normal thereto. Preferably, the sum of the arcuate lengths of the set of two teeth 48 is less than 180°.

Figures 5, 6:
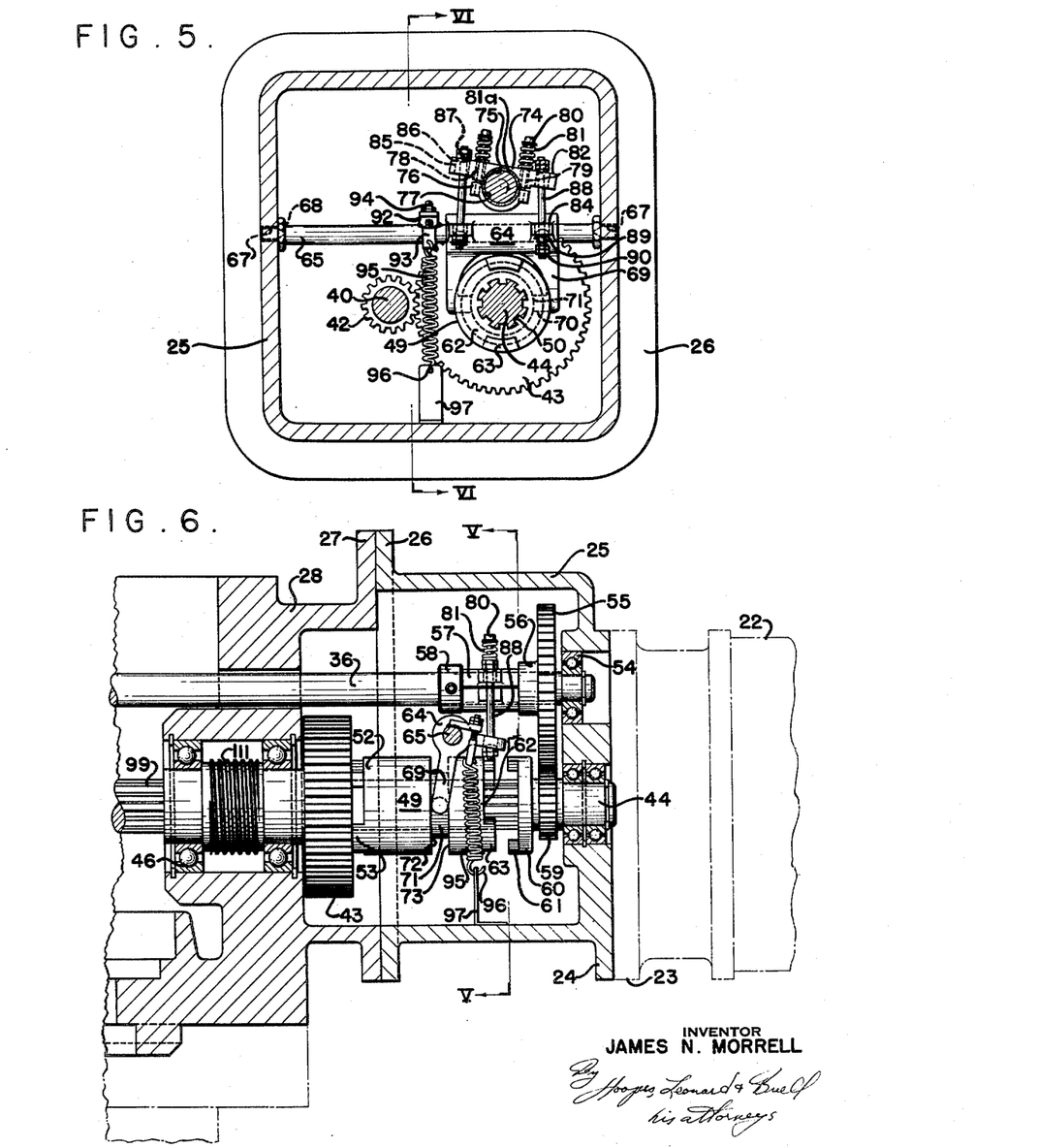
Figure 5 is a view in elevation of the new structure shown in Figure 4 taken substantially along V—V of Figure 6 with the parts in handwheel operating relation.
Figure 6 is a view of the new control in elevation taken substantially along line VI—VI of Figure 5.

Clutch 49 may be in the form of a hollow cylinder or sleeve with longitudinally extending splines 50 engaging corresponding splineways 51 in clutch shaft 44. Hence, as and when clutch 49 is rotated, it will rotate shaft 44 and operate valve control 10 to actuate stem 13 regardless of which axial position clutch 49 has on shaft 44. At end 52 facing gear 43, clutch 49 is provided with a set of arcuate teeth 53 which project axially toward the set of teeth 48 in the manner of the teeth of a crown gear for engagement by the teeth 48 when clutch 49 is in its motor operation relation position as shown in Figure 6, regardless of the direction of rotation of the shafts 37 and 40 due to the energization of motor 22. Preferably, the teeth 53 are at opposite ends of a diameter of the same dimension as the diameter spanning the teeth 48. The arcuate gap between adjoining teeth 53 on clutch 49 is greater than the arcuate length of a tooth 48 to fit in that gap. Thus, when valve control 10 responds to a motor energization when it is in motor operation relation, clutch shaft 44 will receive a so-called "hammer blow" through clutch 49 as the teeth 48 close up any gap between their respective ends and the respective teeth 53 at the initiation of such motor energization.

Figure 4:
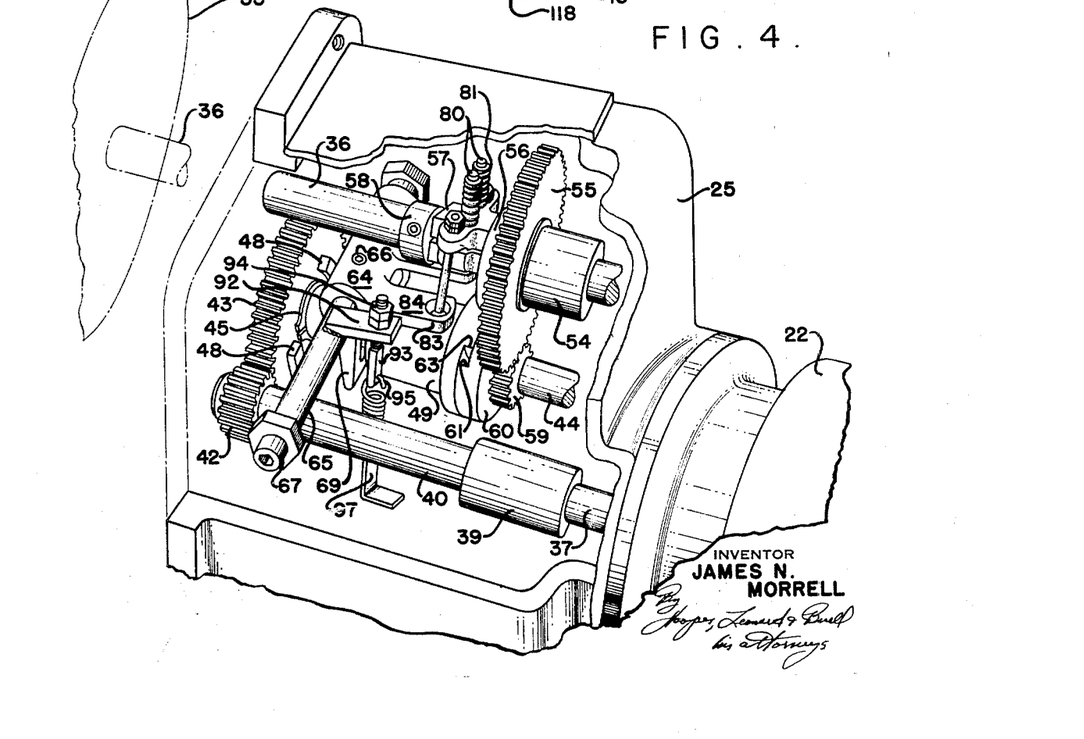
Figure 4 is a perspective view of my automatic non-coincidental clutch mechanism embodied in the new control shown in Figures 1 to 3.
Figure 8:
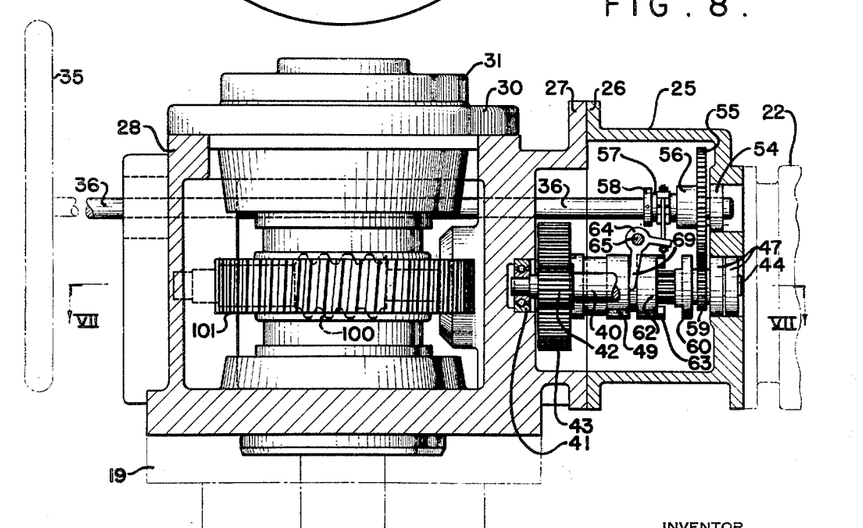
Figure 8 is a view in elevation taken along staggered line VIII—VIII of Figure 7.

Handwheel shaft 36, which may have the handwheel 35 affixed thereto adjacent the side of housing 28 away from the location of motor 22 and the clutch mechanism in case 25, may extend straight into the interior of case 25 parallel to and above shaft 44, proper bearings or bushings being provided for shaft 36 where it passes through various partitions in control 10. The end of handwheel shaft 36 is supported in a bearing 54 in a recess in a partition of case 25 adjacent motor 22. A handwheel drive gear 55 may be keyed to shaft 36 in the position shown in Figures 4, 6 and 8. Gear 55 may have an integral spacer 56 to space a friction collar subassembly 57 which frictionally grips shaft 36. Axial movement of subassembly 57 toward the handwheel end of shaft 36 is prevented in the illustrated embodiment by a collar 58 fixed to shaft 36 on the opposite side of subassembly 57 from spacer 56.

A handwheel driven gear 59 is loosely mounted on clutch shaft 44 so that it can rotate relative to clutch shaft 44 although it cannot move axially along clutch shaft 44.

Handwheel driven gear 59 may be provided with a flanged hub 60 secured to gear 59 to be rotated therewith. Hub 60 may be provided with a set of arcuate teeth 61 projecting axially toward clutch 49. Preferably, the arcuate length of the two teeth 61 which are in diametrically opposed relation to one another, is less than 180°. End 62 of clutch 49 facing hub 60 is provided with a set of arcuate clutch teeth 63 projecting axially toward the respective set of teeth 61 for engagement therewith when control 10 is in the handwheel operation relation position shown in Figures 4 and 5.

Clutch 49 is of such a length that when shifted in either direction along clutch shaft 44 either the clutch teeth 53 will be engaged by teeth 48 for a motor operation or clutch teeth 63 will be engaged by teeth 61 for a handwheel operation, but clutch 49 cannot be engaged at one and the same time by both the respective sets of teeth 48 and 61. Hence, control 10 is fully non-coincidental because when control 10 is actuated by motor 22 while the handwheel 35 is at rest, handwheel 35 is disconnected from the valve-operating parts by virtue of clutch 49 being out of engagement with teeth 61. Conversely, when control 10 is being actuated by handwheel 35, motor 22 is disconnected from the actuating parts engaging the valve stem 13 by virtue of clutch 49 being out of engagement with the teeth 48. Although the respective sets of teeth are shown as pairs of arcuate teeth, either single teeth or multiple sets of teeth may be used or other clutch modifications may be made as will be obvious to those skilled in the art to whom this invention is disclosed.

To shift clutch 49 from one extremity to the other, that is from motor operation position to handwheel operation position, or vice versa, a shifter 64 may be employed. In the embodiment shown, shifter 64 is fastened to a shifter shaft 65 as by a set screw 66. Shifter shaft 65 has an axis in the illustrated embodiment which is normal to the parallel axes of extension shaft 40, clutch shaft 44 and handwheel shaft 36. Cone point bearing screws 67 may extend through tapped and drilled holes in case 25, as shown in Figure 5, and be received in conical sockets 68 in the opposite ends of shaft 65 to permit shaft 65 to rock or pivot on the bearings 67.

Shifter 64 may be provided with spaced depending arms 69 to span the upper half of clutch 49. The lower parts of the arms 69 may be provided with inwardly extending opposed ends 70 which enter a vertical groove 71 so that as shaft 65 is rocked in a clockwise direction, as viewed in Figure 6, clutch 69 will be shifted into motor operation relation position by the engagement of teeth 53 by teeth 48. This shifting is effected by the pressure of ends 70 against the side 72 of groove 71. On the other hand, whenever shaft 65 is in the motor position shown in Figure 6 and then is rotated in a counterclockwise direction, the ends 70 will bear against side 73 of groove 71 in clutch 49 and move teeth 63 into mesh with teeth 61 for actuation of valve stem 13 by a handwheel operation irrespective of whether or not motor 22 may be receiving power at the time handwheel 35 is turned to cause such a handwheel operation. Thus, in my new combination of this invention, a person can turn handwheel 35 and cause a handwheel operation of control 10 both in the case when motor 22 is at rest at that time and in the case when motor 22 is energized and would actuate control 10 were it not for the turning of handwheel 35. In other words, in this invention, the turning of the handwheel 35 will even override any motor operation which may be going on and will maintain such overriding so long as handwheel 35 is being turned in a regular manner.

A friction assembly 57 is used to rotate shifter shaft 65 into handwheel operation relation which is in a counterclockwise direction in the illustrated embodiment (Fig. 6). That assembly 57 may comprise a friction collar consisting of an upper part 74 having a semi-circular recess 75 to fit over the upper part of handwheel shaft 36, the axial length of part 74 fitting in the space between collar 58 and spacer 56. A lower half 76 of the friction collar of assembly 57 is provided with a complementary semi-circular recess 77 to fit around the remaining lower part of shaft 36. The shanks of bolts 78 fastened to lower part 76 extend up through drilled clearance openings 79 in part 74, the uppermost ends of bolts 78 being threaded for the reception of flanged nuts 80. A spring 81 may be interposed around each of the bolts 78 between the part 74 and the flanges of nuts 80. In that way, the frictional force with which the joined parts 74 and 76 grip handwheel shaft 36 may be regulated by correspondingly adjusting the compression of the springs 81 by changing the axial position of the nuts 80 on bolts 78 in the required direction. Each of the semicircular recesses 75 and 77 may be lined with a fibrous friction material 81a fastened to the metal friction collar parts 74 and 76 to frictionally grip the periphery of handwheel shaft 36 in contact with such liners 81a a sufficient amount during the rotation of handwheel shaft 36 to cause handwheel operation of control 10 and thereby handwheel actuation of valve 11.

Upper part 74 is provided with lateral projections 82 extending to each side of shaft 36 generally above the ends 83 of a pair of axially extending arms 84 on shifter 64. The projections 82 are furnished with holes 85, the upper edges of which may be chamfered at 86 to provide a "balljoint" seat for enlarged heads 87 of two tension links 88 which pass through the openings 85 on each side of shaft 36 as shown, for example, in Figure 5. Ends 83 of arms 84 are also provided with openings 89 relatively wide compared to the diameter of the middle portion of the links 88. Enlarged heads 90 are also provided at the lower end of the links 88. The lower part of heads 87 and the upper part of heads 90 may be crowned so that when such a head of one of the links 88 is seated against the edge of its nearer opening, the link will have limited universal movement, as illustrated in Figure 5 where the axis of the left-hand tension link 88 is out of alignment with the axis of the left-hand opening 85. The lower edges of the openings 89 may also be chamfered or countersunk to provide suitable "ball joint" seating for the adjoining portions of the enlarged heads 90. It may also be noted that the enlarged heads 87 and 90 are in the form of lock nuts engaging the respectively threaded ends of the links 88 which is also a means of providing a convenient adjustment for the length of the links 88 to suit the performance required thereof in the operation of embodiments of this invention.

Thus, the links 88 are captive between the friction collar of subassembly 57 and the arms 84 of shifter 64. Hence, as handwheel 35 is turned, in either direction, the friction collar 74—76 will turn in the same direction and the tension link 88 on the side of the rising projection 82 will have the head 87 engage seat 86 while the lower enlarged head 90 of that link 88 will engage its arm 84 on the same side of shaft 36 to pull up on shifter 64 and cause clutch 49 to be moved out of motor operation relation and into engagement with gear 59 and its hub 60 so that teeth 61 will mesh with and press against the teeth 63 (whether or not the motor 22 is running) to rotate clutch shaft 44 by means of such turning of handwheel 35 and handwheel shaft 36.

Shifter shaft 65 may also be provided with a lever 92 secured thereto and extending laterally at an angle to the axis of shaft 65. Lever 92 may be drilled for the passage of a threaded spring retainer 93, the length of which below lever 92 may be adjusted by corresponding adjustment of lock nuts 94. The lower end of retainer 93 may have a hole therein through which one end of a spring 95 passes. The lower end 96 of spring 95 may be engaged by a bracket 97 secured to the floor of case 25. As shown in the embodiment illustrated in Figure 6, the spring 95 at all times exerts through lever 92 a counterclockwise force upon shifter shaft 65 which unless resisted by a stronger force will move ends 70 of shifter 64 to the left, as viewed in Figure 6, thereby bringing teeth 53 of clutch 49 into the gaps between teeth 48 for engagement by teeth 48. Moreover, the action of spring 95 is fully automatic, and, effective whenever a person ceases to turn handwheel 35 and thereby handwheel shaft 36.

As described above, during such turning of handwheel shaft 36, the friction exerted through collar assembly 57 dominates and overrides the force of spring 95 to keep my device in handwheel operation position only so long as there is a turning of shaft 36. Since the pull of spring 95 is exerted whether the parts of my new control clutch mechanism are in hand or in motor operation relation, the force of spring 95 regains ascendency upon cessation of the turning of handwheel shaft 36 and automatically restores clutch 49 to its normal motor operation relation position whether or not motor driven gear 43 is being turned by motor 22 at the time of such restoration. My control at rest is thus always ready for a motor actuation, the overwhelming number of valve control actuations usually being called for by energization of a motor rather than by hand. Yet a person can interrupt motor operation of my new control 10 and take over the actuation of a valve by turning handwheel 35 with both complete safety to the person turning the handwheel and without damage to my new mechanism.

The enlarged end 44a of clutch shaft 44 may be provided with a splined socket 98 to receive a splined end of worm shaft 99 having a worm 100 thereon preferably with a pitch to make worm 100 self-locking relative to a worm wheel gear 101 in engagement therewith. The other end of worm shaft 99 is journaled in a thrust bearing 102 fixed in a slide 103 for some axial movement in either direction under excessive torque conditions for torque switch cut-off purposes.

Figure 7:
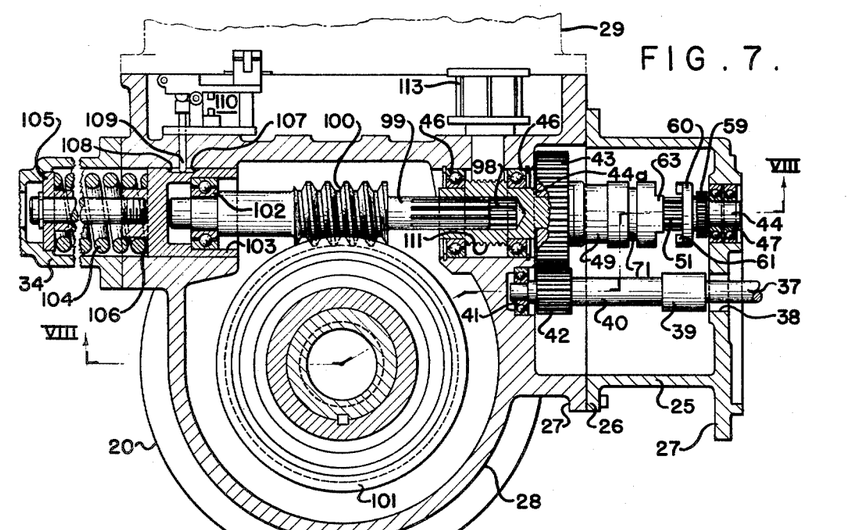
Figure 7 is a plan view partly in section taken generally along VII—VII of Figure 1 which corresponds to a section along line VII—VII of Figure 8.

A torque spring 104 may extend into extension 34 and exert its force against a plate 105 at one end and against a shoulder 106 on slide 103 at the other end. In the course of normal conditions, worm 100 engages worm wheel 101 substantially as shown in the relative position illustrated in Figure 7. In such a normal position, cams 107 and 108 on slide 103 are out of contact with the respective lower ends 109 of two torque pistons behind one another and in the respective paths of inclines 107 and 108. The other ends of the torque pistons are connected to electric contact blocks in the torque cut-off switch assembly 110 in switch box 29. Hence, if there is jamming of the valve in either a valve opening or closing direction, there will be some corresponding endwise movement of worm shaft 99 and the corresponding incline 107 or 108 will contact its respective piston end 109 to cut off the power to motor 22 through electric contact assembly 110, as will be understood by those skilled in the valve control art. Instead of a double-acting torque cut-off arrangement, a single-acting torque cut-off sub-assembly may be provided operative in a valve closing direction only. In addition, the enlarged end 44a of clutch shaft 44 may be provided with spiral threads 111 to turn a limit switch gear 112 as shaft 44 rotates to operate a limit switch 113 to shut off motor 22 when the gate of valve 11 reaches its prescribed limits. The wiring for such limit switch may be in whatever automatic sequence may be desired and further may be connected in series or otherwise to the torque cut-off switch.

As worm shaft 99 is rotated in either direction in response to the energization of motor 22 within the torque switch setting of valve control 10, or to the turning of handwheel 35, worm 100 will correspondingly rotate and drive worm wheel 101. As shown, worm 100 and worm wheel 101 are self-locking thereby preventing worm 100 from being turned by any force exerted on it through worm wheel 101. Worm wheel 101 fits on a stem nut 114 having a removable bushing liner 115 keyed to nut 114 by a key 116. Liner 115 and key 116 are made a part of nut 114 by a threaded retainer ring 117 engaging the internally threaded upper end of nut 114. Liner 115 is provided with female threads which engage the male threads 118 of valve stem 13.

Figure 9:
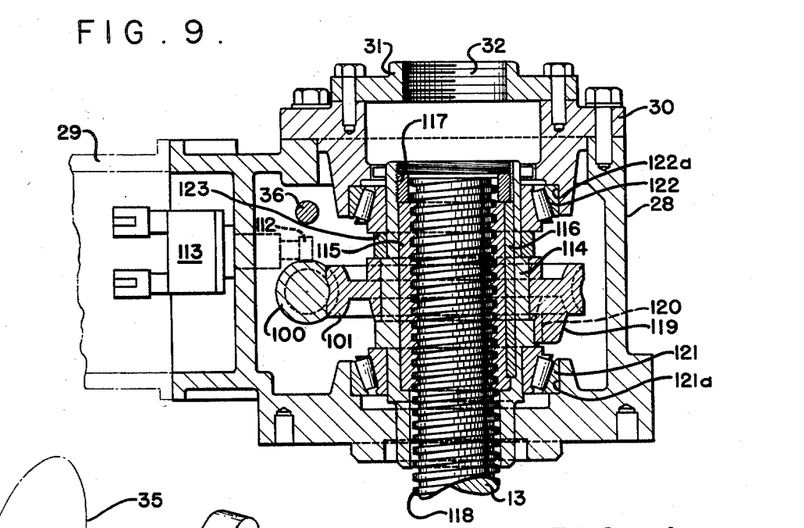
Figure 9 is a view of the new control in elevation taken along line IX—IX of Figure 2.
Figures 10, 12:
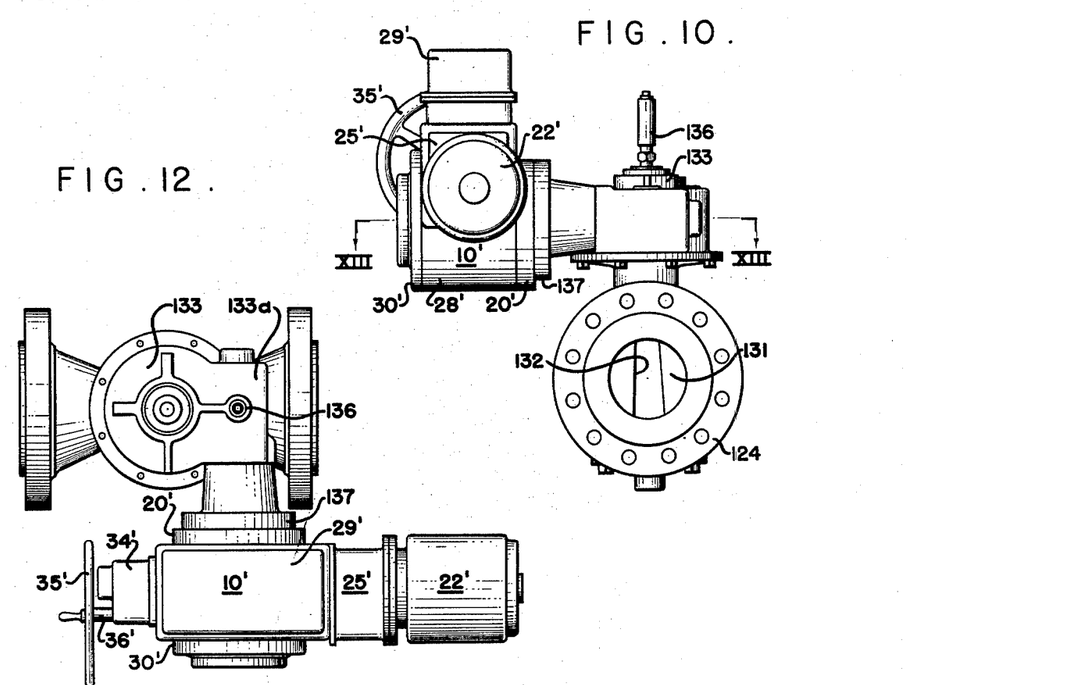
Figure 10 is a view in end elevation of the foregoing embodiment of my new control mounted on a side of a non-rising stem plug valve.
Figure 12 is a view in plan of the structure shown in Figure 10.
Figure 11:
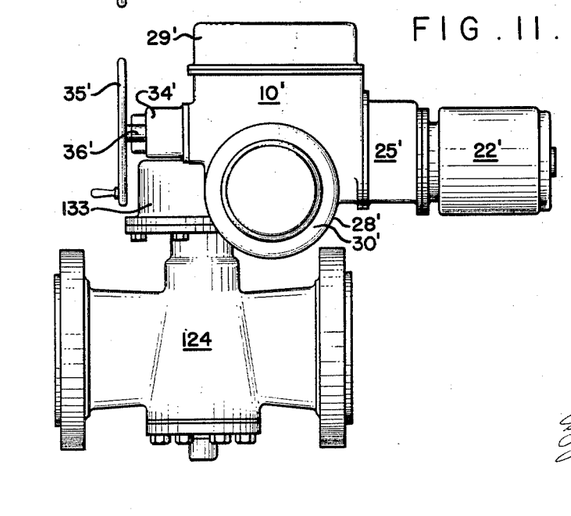
Figure 11 is a view in side elevation of the structure shown in Figure 10.

Worm wheel 101 is provided with an integral depending lug 119 which fits between two projections 120 of nut 114 on either side of lug 119. Hence, regardless of the direction in which worm wheel 101 is rotated about the axis of valve stem 13 by the turning of worm 100 in one direction or the other, worm wheel 101 will correspondingly rotate stem nut 114 inclusive of its liner 115 and key 116 to make valve stem 13 rise or fall depending upon the direction of rotation of nut 114. To hold stem nut 114 against axial movement relative to the axis of stem 13, roller bearings 121 and 122 may be provided at the upper end and lower end of the nut 114 as illustrated in Figure 9, a spacing ring 123 being utilized in the embodiment shown to assist in that purpose and also to bear against the top of the hub of worm wheel 101 and hold it against axial movement at the same time without interfering with its rotation in the course of any actuation of control 10. The roller bearings 121 and 122 respectively fit into recessed members 121a and 122a in housing 28 and cover 30 respectively.

The embodiment of my valve control, which is illustrated in Figures 1 to 9, inclusive, may, with other embodiments of my invention, be utilized in a side-mounted position for use on valves of varying kinds and with varying kinds of stems or valve spindles. Thus, in Figures 10 to 13, inclusive, a valve control similar to the embodiment of new valve control 10 is applied in a so-called side-mounted position relative to a plug valve 124. Parts of my new valve control shown in Figures 10 to 13 inclusive of the clutch mechanism correspond in structure and functioning to parts of valve control 10 and are provided with the same reference numerals, with the addition of a prime factor thereto, on such portions as appear in Figures 10 to 13. However, for such side mounting, parts in gear housing 28' and between that gear housing and plug valve 124 do not have entire correspondence. Moreover, the torque cut-off and limit switch arrangements for valve control 10 will be arranged so as to be suitable for the desired valve operation and sequence of plug valve 124.

Figure 13:
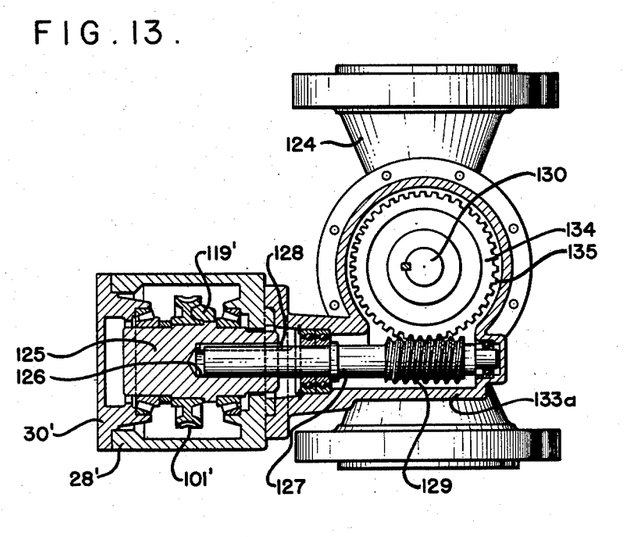
Figure 13 is a view in section taken along line XIII—XIII of Figure 10.

Gear housing 28' is provided with a cover 30' which is closed since there is no valve stem to pass therethrough in the course of any actuation of the structure illustrated in Figures 10 to 13. Instead, worm wheel 101' is keyed by its lug 119' to a socket 125 the outer configuration and mounting of which may be like the configuration and mounting of stem nut 114. Socket 125 is provided with a bore 126 for the reception of the end of a stub shaft 127, a key 128 serving to turn shaft 127 as socket 125 is rotated by worm wheel 101' in the course of either a handwheel actuation or motor actuation of control 10'. Shaft 127 is journaled in bearings as shown in Figure 13 and has a secondary worm 129 affixed thereto for rotation in whatever direction worm wheel 101' may be turned by its primary worm 100' which is not shown since it is like the corresponding part 100 in control 10.

Plug valve 124 has a stem 130 which is rotated to turn a valve plug 131 having a valve opening 132 therein, to whatever direction may be desired between fully open and fully closed positions. Stem 130 extends upwardly into a valve bonnet 133 containing a bearing for the upper end of stem 130 and space for a secondary worm gear wheel 134 which is keyed to stem 130 to rotate the same. The teeth 135 of secondary worm wheel 134 are in engagement with the teeth of secondary worm 129 which with its shaft 127 are in extension 133a of bonnet 133. A lubricator 136 may be provided above the worm 129 and parts in secondary housings 133 and 133a. Flange 137 of extension housing 133a is provided with bolt holes drilled for registry with corresponding bolt holes in seating flange 20' on control 10'.

The significant functioning of my control 10' occurs in the same manner as the functioning of my control 10 except that the rotation of primary worm 100' in control 10' in either direction will rotate valve stem 130 in a corresponding direction through intermediary secondary elements described above inclusive of secondary worm 129 and secondary worm wheel 134. In some cases, a bevel pinion and bevel ring gear may respectively be substituted for the secondary worm and secondary worm wheel.

Further, while the illustrated embodiment of my invention herein describes new structure whereby actuation of the new control by the handwheel will override a force constantly urging my device into motor operation relation position, it will be understood that my device may be adjusted so that such overriding by handwheel mechanism may be caused to take place only when the motor is stopped, that is, when the motor mechanism is at rest, if such is desired in certain kinds of service to which my invention may be applied. Indeed, various modifications and changes may be made in my new device without departing from the spirit of my invention or the scope of the appended claims.

I claim:

1. In a control for a valve or the like, in combination, a worm shaft having a worm fixed thereto, a worm gear connected to said valve or the like, said worm normally engaging said worm gear and adapted upon rotation of said worm shaft to operate said valve or the like through said worm gear, a clutch shaft to drive said worm shaft in either direction, a motor-driven gear loosely mounted on said clutch shaft, a motor extension shaft having a motor drive pinion fixed thereto and adapted to engage said motor-driven gear, a double-ended clutch member mounted on said clutch shaft in slidably movable rotatably keyed relation to said clutch shaft, said motor-driven gear having a set of axially projecting teeth thereon extending toward said clutch member, a handwheel shaft having a handwheel and a handwheel drive gear fixed thereto, a handwheel-driven gear loosely mounted on said clutch shaft, said clutch shaft being generally parallel to said extension shaft and to said handwheel shaft, said handwheel-driven gear having a set of axially projecting teeth extending toward said clutch member, said set of teeth of said motor-driven gear and said set of teeth of said handwheel-driven gear being in opposed relation and spaced apart a distance such that said clutch member may be moved to engage one or the other of said sets of teeth but not both of said respective sets of teeth at the same time, said clutch member having outwardly extending sets of clutch teeth to cooperate respectively with one or the other of said two first-mentioned sets of teeth, a shifter connected to said clutch member and adapted to be rotated about an axis at an angle to the axis of said clutch member to move said clutch member into engagement with one of said two first-mentioned sets of teeth, a spring normally and automatically urging said clutch member into engagement with said set of teeth of said motor-driven gear, a friction collar engaging said handwheel shaft, means for adjusting the friction between said collar and said shaft, a tension link extending between said collar and said shifter on each side of said handwheel shaft, said spring having a force sufficient to overcome the friction tending to hold said clutch member in handwheel-drive connection after a handwheel-drive operation and when said handwheel shaft is not being rotated to press said clutch member into engagement with said set of teeth of said motor-driven gear and conversely said handwheel shaft and said collar having a frictional force between them when said handwheel is rotated such that it will rotate said shifter and thereby move said clutch member into engagement with said set of teeth of said handwheel-driven gear against the resistance of said spring, the force of said spring being in opposition throughout the existence of any frictional force between said collar and said shaft.

2. In a control for a valve or the like, in combination, a clutch shaft adapted to operate a stem for a valve or the like, a motor-driven gear loosely mounted on said clutch shaft, a motor drive pinion adapted to engage said motor-driven gear, a clutch member mounted on said clutch shaft in rotatably keyed relation to said clutch shaft, said motor-driven gear being connected to a set of teeth adapted to engage said clutch member, a handwheel-driven gear loosely mounted on said clutch shaft, a handwheel drive gear adapted to engage said handwheel-driven gear, said handwheel-driven gear being connected to a set of teeth adapted to engage said clutch member, means to move said clutch member relatively to engage one or the other of said sets of teeth but not both of said respective sets of teeth at the same time, pressure means normally relatively urging said clutch member into engagement with said first-mentioned set of teeth, a friction collar adapted to be operatively connected to said first-mentioned means, a link connecting said collar to said clutch member on each side of the axis of said collar, said pressure means having a force sufficient to overcome the friction tending to hold said clutch member in handwheel drive connection after a handwheel drive operation and when said handwheel drive gear is not being rotated, to cause the engagement of said clutch member with said first-mentioned set of teeth and conversely said collar having a frictional force sufficient when said handwheel drive gear is rotated to cause the engagement of said clutch member with said second-mentioned set of teeth against the resistance of said pressure means, the force of said pressure means being in opposition throughout the existence of any said frictional force.

3. In a control for a valve or the like, in combination, a worm and a worm gear adapted upon rotation of said worm in either direction to operate said valve or the like, a clutch shaft connected to said worm to rotate said worm, a motor-driven gear loosely mounted on said clutch shaft, a motor drive pinion adapted to be turned in either direction by a motor and to engage said motor-driven gear, a sliding clutch member connected to said clutch shaft to rotate it, said motor-driven gear being connected to a set of teeth to engage said clutch member, a handwheel shaft having a handwheel drive gear fixed thereto, a handwheel-driven gear loosely mounted on said clutch shaft, said handwheel-driven gear being connected to a set of teeth to engage said clutch member, said two sets of teeth being apart a sufficient distance to enable said clutch member to engage only one or the other of said sets of teeth, a shifter connected to said clutch member to move it into engagement with one of said respective sets of teeth, yieldable means constantly urging said shifter to move said clutch member into engagement with said first-mentioned set of teeth connected to said motor-driven gear, friction means engaging said handwheel shaft, means connecting said friction means and said shifter to move, when said handwheel shaft is turned, said clutch member into engagement with said second-mentioned set of teeth connected to said handwheel-driven gear, said yieldable means having a force sufficient to overcome friction in the mechanism between said handwheel and said shifter when said handwheel shaft is not being rotated and said friction means having a frictional force sufficient to overcome said yieldable means when said handwheel shaft is rotated, the force of said yieldable means being in opposition throughout the existence of any said frictional force.

4. In a control for a valve or the like, in combination, a worm shaft having a worm fixed thereto to rotate a worm gear to operate said valve or the like, a clutch shaft connected to said worm shaft to rotate said worm shaft, a motor-driven gear engaging said clutch shaft, a motor drive pinion to engage said motor-driven gear, a clutch member engaging said clutch shaft to rotate said clutch shaft when said clutch member is rotated, said motor-driven gear having means to engage said clutch member at certain times, a handwheel-driven gear engaging said clutch shaft, a handwheel drive gear to engage said handwheel-driven gear, said handwheel-driven gear having means to engage said clutch member at other times, a shifter connected to said clutch member to move said clutch member into engagement with one or the other of said respective means irrespective of the direction of movement of either of said means, a spring constantly in connection with said shifter to urge said clutch member toward engagement with said motor-driven gear means, a friction member adapted to be operatively connected to said shifter to move said shifter to move said clutch member into engagement with said handwheel-driven means, the balance of forces between said spring and said friction member being such that when said handwheel drive gear is turned, the frictional force exerted through said friction member will overcome the force of said spring whether said motor drive pinion is rotating or not, the force of said spring being in opposition throughout the existence of any said frictional force.

5. In a control for a valve or the like, in combination, a worm shaft having a worm fixed thereto to rotate a worm gear to operate said valve or the like, a reversible clutch shaft connected ahead of said worm shaft to rotate said worm shaft, a motor-driven gear mounted in coaxial relation to said clutch shaft, a motor drive pinion to engage said motor-driven gear, a clutch member engaging said clutch shaft to rotate said clutch shaft when said clutch member is rotated, said motor-driven gear having projecting means to engage said clutch member at certain times, a handwheel-driven gear mounted in coaxial relation to said clutch shaft, a handwheel drive gear to engage said handwheel-driven gear, said handwheel-driven gear having projecting means to engage said clutch member at times other than said certain times, means for moving said clutch member in opposite directions selectively and relatively to one or the other of said projecting means for operative connection thereto respectively, one force applying means constantly pressing said clutch member and said motor-driven gear projecting means toward operative connection with each other, another force applying means to move said clutch member relatively into operative connection with said handgear projecting means, said another force applying means having sufficient force to overcome said first-mentioned one force force applying means when said handwheel drive gear is turned, said first-mentioned one force applying means having sufficient force to overcome said second-mentioned another force applying means when said handwheel is substantially at rest.

6. In a control for a valve or the like, in combination, a mechanism having a rotatable gear connected to the stem of a valve or the like to operate it, a motor, a motor driver operatively connected to said motor to be turned by the rotation of such motor, a clutch member, bias means operatively connected to said clutch member to constantly urge said clutch member into operatively connected relation to said motor driver to be operated when said motor is actuated, means connected to said clutch member to be rotated when said clutch member is rotated to operate said rotatable gear, an auxiliary drive means, an auxiliary driver operatively connected to said auxiliary drive means, said motor driver and said auxiliary driver being in opposed spaced relation such that said clutch member cannot be connected to both said gears at one and the same time, and means operatively connected to said clutch member and operative when said auxiliary drive means is operated to apply force to override said bias means to relatively move said clutch member away from said motor driver and operatively connect it to said auxiliary driver.

References Cited in the file of this patent
UNITED STATES PATENTS

| | | |
|---|---|---|
| 2,592,374 | Ball | Apr. 8, 1952 |
| 2,775,908 | Elliott et al. | Jan. 1, 1957 |

UNITED STATES PATENT OFFICE
CERTIFICATE OF CORRECTION

December 15, 1959

Patent No. 2,916,947

James N. Morrell

It is hereby certified that error appears in the printed specification of the above numbered patent requiring correction and that the said Letters Patent should read as corrected below.

Column 10, line 73, for "handgear" read -- handwheel-driven gear --; line 75, strike out "force", second occurrence; column 11, line 12, for "operated" read -- rotated --; column 12, line 14, list of references cited, for "Ball" read -- Ball et al --.

Signed and sealed this 31st day of May 1960.

(SEAL)
Attest:

KARL H. AXLINE
Attesting Officer

ROBERT C. WATSON
Commissioner of Patents

UNITED STATES PATENT OFFICE

CERTIFICATE OF CORRECTION

Patent No. 2,916,947              December 15, 1959

James N. Morrell

It is hereby certified that error appears in the above numbered patent requiring correction and that the said Letters Patent should read as corrected below.

Column 12, line 5, for "gears" read -- drivers --.

Signed and sealed this 24th day of April 1962.

(SEAL)
Attest:

ESTON G. JOHNSON
Attesting Officer

DAVID L. LADD
Commissioner of Patents